Oct. 7, 1924.
E. WALKER
PASSENGER REGISTER
Filed June 13, 1923
1,510,875
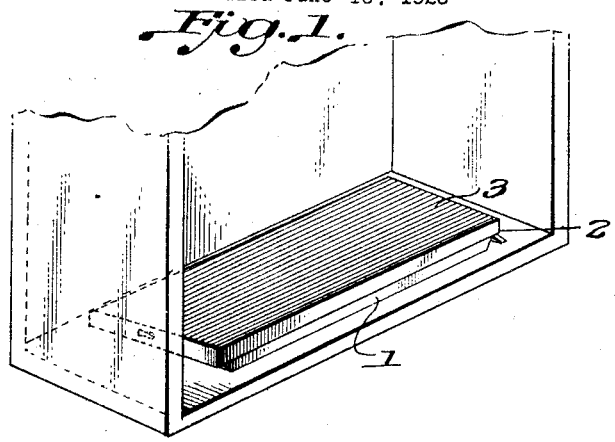
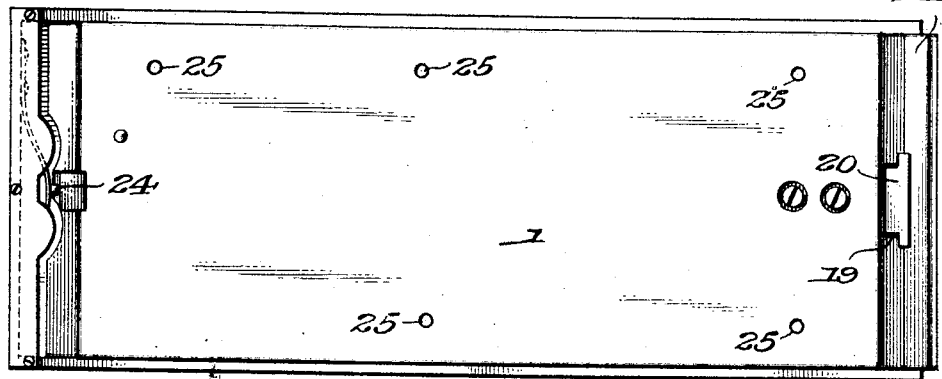
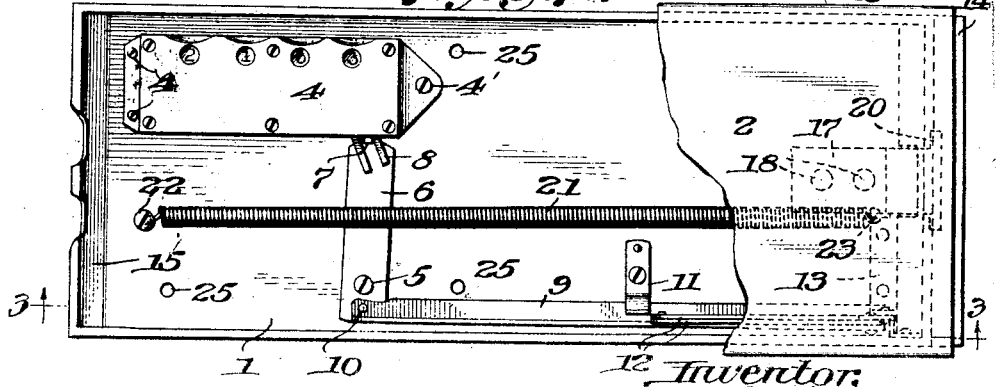
Inventor:
Everett Walker Patented Oct. 7, 1924.

1,510,875

UNITED STATES PATENT OFFICE.

EVERETT WALKER, OF PORTSMOUTH, VIRGINIA.

PASSENGER REGISTER.

Application filed June 13, 1923. Serial No. 645,102.

*To all whom it may concern:*

Be it known that I, EVERETT WALKER, a citizen of the United States, residing at Portsmouth, in the county of Norfolk and State of Virginia, have invented certain new and useful Improvements in Passenger Registers, of which the following is a specification.

This invention relates to a register adapted to be placed on the step of a bus, street car, or other vehicle which carries passengers who pay fares, which will automatically count or register each passenger who enters the vehicle so that at the end of the run or at any desired time, a checker or inspector may determine the number of passengers carried by the vehicle.

Registers of this general character have heretofore been proposed but, so far as I am aware, earlier inventive efforts along this line have been unsuccessful due to the requirements to be met by a device of this character. The object of my invention is the provision of a step or tread register of improved construction and operation which will be accurate, operable regardless of what part thereof is touched by the foot of the passenger and without regard to the weight of the passenger, and which will be waterproof and dirt-proof, and will not become frozen in winter.

A further object is to provide an improved step register which is normally locked so that it cannot be tampered with and can only be opened by an authorized person for the purpose of checking up the reading of the counter with the number of fares turned in by the conductor or operator of the vehicle.

To accomplish the objects of the invention, I have provided a bottom section and a tread section which is movably mounted in a novel manner in relation to the bottom section so that a relatively shifting or sliding action occurs when the tread section is depressed by the weight of a person, together with counting mechanism which is housed by the bottom section and tread section and is operated from the tread section by improved means. The tread section is normally held in operative position by spring means, said means restoring the tread section to normal position after the weight of the passenger has been removed.

The tread section and bottom section are locked together so that access can only be had to the counter by an authorized person having a key suitable for unlocking the device.

A practical embodiment of the invention is set forth hereinafter and disclosed in the accompanying drawings, this embodiment disclosing the principle of the invention. I wish it understood, however, that the invention is susceptible of modification without departing from the principle thereof and that the improvements are not limited to the specific features hereinafter set forth except where recited in the claims.

In the accompanying drawings:

Figure 1 is a view showing the register applied to the step of a bus;

Fig. 2 is a bottom view of the register;

Fig. 3 is a longitudinal section on the line 3—3, Fig. 4, taken through the tread section and bottom section, the operating means being shown in full lines; and Fig. 4 is a plan view, the tread section being broken away to disclose the operating means.

The bottom section 1 is in the form of a shallow box-like tray which is made of some suitable material such as cast iron. The tread section 2 is in the form of a cover for the section 1 and is of any suitable material, for instance, cast iron; any desired tread surface 3 may be provided for the tread section 2. The counter or register 4 which is actuated each time the tread section 2 is depressed, is located inside the bottom section 1 and suitably secured thereto as by screws 4' which enable the register or counter to be removed for inspection or repairs whenever necessary. The counter or register 4 is so located that when the tread section 2 is unlocked and raised by the checker or inspector, the indication may be readily observed.

I am aware that various mechanical arrangements can be resorted to for actuating the counter 4 each time the tread section 2 is depressed and I do not limit myself to the arrangement now to be described.

Pivoted at 5 to the bottom section 1 is a rocker 6 which has any suitable connection 7 with the actuating lever or member 8 of the counter 4. A slide bar 9 is pivoted at 10 to the rocker 6 and suitably guided at 11.

A linkage 12 pivotally connects the sliding bar 9 to a bracket 13 carried by the under side of the tread section 2.

The bottom section 1 is provided at one end with an inclined lip 14 and at its other end with an inclined surface 15 which acts as a cam. The lower edge of one end of of the tread section 2 cooperates with the lip 14 and is preferably beveled to facilitate this cooperation. An inclined lip 16 on the inside of the tread section 2 is arranged to cooperate with the inclined surface 15.

A stop 17 yieldingly secured to the under side of the tread section 2 by the screws and springs 18, extends through a slot 19 in the bottom section 1 and is provided with a head 20 which limits the rise of the tread section 2 as well as cooperating with the under side of the lip 14.

A contractile coil spring 21 is connected at one end to the bottom section 1 as, for instance, by a screw 22 and at its other end to the tread section 2 as, for instance, by a connection 23. This spring is of such tension that, by drawing on the sections 1 and 2 in the direction of their length, causes the tread section 2 to be elevated when the weight of the passenger is removed. This elevating action is due to the tension of the spring combined with the cam action exerted by the lips 14 and 16.

A suitable lock is provided for locking the sections 1 and 2 together. One example of a lock for this purpose is shown at 24. The key to the lock will be in the possession of an authorized person such as a checker or inspector who will, at the end of the run of the vehicle, or any other predetermined time, or after any other predetermined period, or as desired, unlock the tread section 2 and raise it sufficiently to have inspection of the counter 4 to read the indication thereon. The counter 4 is of the type which may be re-set to zero when desired. Thus, after the indication on the counter is noted, the checker or inspector will re-set the counter to zero and thus avoid the necessity of keeping track of the last number indicated on the counter.

Suitable screw or bolt holes 25 afford means for the passage of screws or bolts to connect the bottom section 1 to the step of the bus, street car, or other vehicle. The tread section 2 is then in position that it is necessary for each passenger entering the vehicle to step on the tread section. When the tread section is stepped upon, the weight of the passenger causes the tread section to be depressed against the action of the spring 21, the movement being a sliding or shifting movement in the direction of the length of the top and bottom section. This movement causes the counter actuating mechanism to count "one" on the counter. Immediately the passenger's weight is removed from the tread section 2 the coil spring 21 contracts and, by the camming action of the lips 14 and 16, the tread is restored to normal position.

The lock at one end of the device and the stop at the other end prevent any unauthorized opening of the register. At the same time, the stop serves as a hinge which permits the tread section to be raised a sufficient distance by hand to enable inspection of the counter to be had by an authorized person.

My register provides for an effective check against the conductor or fare collector or driver of a bus, street car, or other vehicle carrying passengers for a fare.

In those busses commonly used in cities where the passengers enter and leave by the same entrance, it is only necessary to divide by two the number indicated on the counter 4 in order to ascertain the number of fares which should be turned in by the fare collector, the driver, for instance, at the end of a given run or period of time.

When the device is used in connection with street cars where the same rule prevails as, for instance "one man" cars, the same method of check up may be followed. In those street cars where the passengers enter at one door and emerge at another door, regardless of the point at which the fare is collected, the counter will show, without computation the number of fares which should have been collected. Thus, condition of use of the device will determine whether the exact number shown by the counter represents the number of passengers carried, or double the number of passengers from whom fares should have been collected.

Due to the fact that the tread section 2 encloses the bottom section 1, snow, water, and sleet will be shed from the device in such manner that they cannot interfere with its operation. Furthermore, the cooperation of the tread section and bottom section is such that no matter where the foot of the passenger rests upon the tread section, the said section will be depressed and count "one" on the counter 4.

The present invention may be used in many other places than on busses, street cars, and vehicles, for instance at theaters, fairs, public buildings, and places where it is desired to ascertain the number of persons passing a given point. It is to be understood, therefore, that in designating the device as a "step register" and for use on "passenger vehicles" in the claims, this is by way of example and not in limitation of the uses to which the invention may be put.

I claim:

1. In a step register for passenger vehicles, the combination with a bottom section, of a depressible tread section which is mounted to bodily shift laterally in relation to the bottom section, and a counter cooperatively related to said sections adapted to indicate the number of times the tread section is depressed.

2. In a step register for passenger vehicles, the combination with a bottom section, of a depressible tread section which is telescoped over the bottom section and is mounted to bodily shift laterally in relation to the bottom section, and a counter operable by the tread section.

3. In a step register for passenger vehicles, the combination with a bottom section, of a depressible tread section which is telescoped over the bottom section and is mounted to bodily shift laterally in relation to the bottom section, and a counter located between, and housed by, the bottom section and the tread section and operably connected to the tread section, said tread section and bottom section being locked together but with adaptability for movement as aforesaid.

4. In a step register for passenger vehicles, the combination with a bottom section, of a depressible tread section which is telescoped over the bottom section and is mounted to bodily shift laterally in relation to the bottom section, a counter operably connected to the tread section, and means for connecting the bottom section and tread section together without interfering with the operation of the tread section.

5. In a step register for passenger vehicles, the combination with a bottom section, of a depressible tread section, means mounting the tread section so that it is adapted to have a bodily laterally shifting motion in relation to the bottom section when depressed, spring means located between the aforesaid sections for holding the tread section normally elevated, and a counter cooperatively related to the tread section.

6. In a step register for passenger vehicles, the combination with a bottom section, of a depressible tread section which is mounted for bodily shifting laterally in relation to the bottom section, the said sections having cooperating camming means at different points whereby the tread section is adapted to shift or slide in relation to the bottom section regardless of what part of the tread section is depressed, spring means for normally holding the tread section in raised position, and a counter cooperating with the tread section.

7. In a step register for passenger vehicles, the combination with a bottom section, of a depressible tread section telescoping therewith which is mounted for bodily shifting laterally in relation to the bottom section, said sections having a combined hinge and stop joint at one point so that they can be opened, a lock at another point for securing the said sections together, means mounting the tread section so that it is adapted to have the aforesaid bodily shifting relationship to the bottom section, spring means housed by said sections adapted to hold the tread section normally raised, and a counter housed by said sections which has an operative connection to the tread section.

8. In a step register for passenger vehicles, the combination with a bottom section, of a depressible tread section, cooperating inclined parts on the respective sections by which the tread section is adapted to shift in relation to the bottom section, spring means connecting said sections adapted for holding the tread section normally raised, and a counter operably connected to the tread section.

In testimony whereof I affix my signature.

EVERETT WALKER.